(12) United States Patent
Caduff

(10) Patent No.: US 8,745,090 B2
(45) Date of Patent: Jun. 3, 2014

(54) SYSTEM AND METHOD FOR EXPLORING 3D SCENES BY POINTING AT A REFERENCE OBJECT

(75) Inventor: David Caduff, Degen (CH)

(73) Assignee: Ipointer, Inc., Bakersfield, CA (US)

( * ) Notice: Subject to any disclaimer, the term of this patent is extended or adjusted under 35 U.S.C. 154(b) by 488 days.

(21) Appl. No.: 12/645,243

(22) Filed: Dec. 22, 2009

(65) Prior Publication Data

US 2010/0306707 A1 Dec. 2, 2010

Related U.S. Application Data

(60) Provisional application No. 61/139,900, filed on Dec. 22, 2008.

(51) Int. Cl.
  *G06F 17/30* (2006.01)
(52) U.S. Cl.
  USPC .......................................... 707/791; 707/802
(58) Field of Classification Search
  USPC .................................................. 707/791, 802
  See application file for complete search history.

(56) References Cited

U.S. PATENT DOCUMENTS

| | | | |
|---|---|---|---|
| 5,214,757 A | 5/1993 | Mauney et al. | |
| 5,470,233 A | 11/1995 | Fruchterman et al. | |
| 5,592,382 A | 1/1997 | Colley | |
| 5,628,050 A | 5/1997 | McGraw et al. | |
| 5,633,946 A | 5/1997 | Lachinski et al. | |
| 5,745,113 A | 4/1998 | Jordan et al. | |
| 5,771,169 A | 6/1998 | Wendte | |
| 5,848,373 A | 12/1998 | DeLorme et al. | |
| 6,070,167 A | 5/2000 | Qian et al. | |
| 6,144,318 A | 11/2000 | Hayashi et al. | |
| 6,173,239 B1 | 1/2001 | Ellenby | |
| 6,222,482 B1 | 4/2001 | Gueziec | |
| 6,247,019 B1 | 6/2001 | Davies | |
| 6,262,741 B1 | 7/2001 | Davies | |
| 6,282,362 B1 | 8/2001 | Murphy et al. | |
| 6,334,087 B1 | 12/2001 | Nakano et al. | |
| 6,381,540 B1 | 4/2002 | Beason et al. | |

(Continued)

FOREIGN PATENT DOCUMENTS

| WO | WO-2008/005795 | 1/2008 |
|---|---|---|
| WO | WO-2009/111578 | 9/2009 |

(Continued)

OTHER PUBLICATIONS

International Search Report for PCT/US2009/069237 from the International Searching Authority of the United States Patent & Trademark Office dated Mar. 4, 2010, 2 pages.

(Continued)

*Primary Examiner* — Son T Hoang
(74) *Attorney, Agent, or Firm* — Wilmer Cutler Pickering Hale and Dorr LLP

(57) ABSTRACT

A system and method for enhancing location-based services by enabling spatial database systems to respond to or answer spatial queries that use a reference object to identify objects or features of interest in an environmental scene before a system user. The system and method for enhancing pointing technology by permitting system users to use queries to identify objects or features within the system user's field of view by pointing at the reference object or feature, and linking it to the object of interest by using spatial prepositions.

20 Claims, 6 Drawing Sheets

(56) References Cited

U.S. PATENT DOCUMENTS

| | | | |
|---|---|---|---|
| 6,385,541 | B1 | 5/2002 | Blumberg et al. |
| 6,456,938 | B1 | 9/2002 | Barnard |
| 6,486,831 | B1 | 11/2002 | Martorana et al. |
| 6,496,776 | B1 | 12/2002 | Blumberg et al. |
| 6,504,541 | B1 | 1/2003 | Liu et al. |
| 6,532,304 | B1 | 3/2003 | Liu et al. |
| 6,606,542 | B2 | 8/2003 | Hauwiller et al. |
| 6,708,109 | B1 | 3/2004 | Pradhan et al. |
| 6,732,120 | B1 | 5/2004 | Du |
| 6,795,768 | B2 | 9/2004 | Bragansa et al. |
| 6,799,115 | B1 | 9/2004 | Childs et al. |
| 6,847,883 | B1 | 1/2005 | Walmsley et al. |
| 6,879,838 | B2 | 4/2005 | Rankin et al. |
| 6,912,545 | B1 | 6/2005 | Lundy et al. |
| 6,930,715 | B1 | 8/2005 | Mower |
| 6,965,828 | B2 | 11/2005 | Pollard |
| 6,982,697 | B2 | 1/2006 | Wilson et al. |
| 6,983,202 | B2 | 1/2006 | Sanqunetti |
| 7,031,875 | B2 | 4/2006 | Ellenby et al. |
| 7,072,665 | B1 | 7/2006 | Blumberg et al. |
| 7,174,301 | B2 | 2/2007 | Florance et al. |
| 7,245,923 | B2 | 7/2007 | Frank et al. |
| 7,295,922 | B2 | 11/2007 | Simon et al. |
| 7,418,341 | B2 | 8/2008 | Wuersch et al. |
| 2001/0044309 | A1 | 11/2001 | Bar et al. |
| 2002/0140745 | A1* | 10/2002 | Ellenby et al. ............... 345/848 |
| 2002/0155844 | A1 | 10/2002 | Rankin et al. |
| 2002/0165662 | A1 | 11/2002 | Maruyama et al. |
| 2002/0171586 | A1 | 11/2002 | Martorana et al. |
| 2003/0083063 | A1 | 5/2003 | Wang et al. |
| 2003/0149557 | A1 | 8/2003 | Cox et al. |
| 2004/0002303 | A1 | 1/2004 | Hirokawa |
| 2004/0021780 | A1* | 2/2004 | Kogan ...................... 348/231.3 |
| 2004/0024522 | A1 | 2/2004 | Walker et al. |
| 2004/0078278 | A1 | 4/2004 | Dauga et al. |
| 2004/0087294 | A1 | 5/2004 | Wang |
| 2004/0145591 | A1 | 7/2004 | Luo et al. |
| 2005/0075119 | A1 | 4/2005 | Sheha et al. |
| 2005/0108646 | A1 | 5/2005 | Willins et al. |
| 2005/0125145 | A1* | 6/2005 | Sakashita et al. ............ 701/208 |
| 2005/0130671 | A1 | 6/2005 | Frank et al. |
| 2005/0165548 | A1 | 7/2005 | Persson |
| 2005/0288858 | A1 | 12/2005 | Amer et al. |
| 2006/0041375 | A1 | 2/2006 | Witmer et al. |
| 2006/0103590 | A1 | 5/2006 | Divon |
| 2006/0208927 | A1 | 9/2006 | Poor et al. |
| 2006/0270460 | A1 | 11/2006 | Konkka et al. |
| 2006/0294062 | A1 | 12/2006 | Folchetti et al. |
| 2007/0049313 | A1 | 3/2007 | Grams et al. |
| 2007/0050129 | A1 | 3/2007 | Salmre |
| 2007/0055441 | A1 | 3/2007 | Retterath et al. |
| 2007/0061072 | A1* | 3/2007 | Wuersch et al. ............. 701/210 |
| 2007/0150179 | A1 | 6/2007 | Pinkus et al. |
| 2007/0288196 | A1* | 12/2007 | Frank et al. ................... 702/151 |
| 2008/0049016 | A1 | 2/2008 | Shearer |
| 2008/0070684 | A1 | 3/2008 | Haigh-Hutchinson |
| 2008/0109758 | A1 | 5/2008 | Stambaugh |
| 2008/0114564 | A1 | 5/2008 | Ihara |
| 2008/0133488 | A1 | 6/2008 | Bandaru et al. |
| 2008/0162032 | A1 | 7/2008 | Wuersch et al. |
| 2008/0262723 | A1 | 10/2008 | Wuersch et al. |
| 2009/0227269 | A1 | 9/2009 | Frank et al. |
| 2010/0303293 | A1 | 12/2010 | Caduff |
| 2010/0303339 | A1 | 12/2010 | Caduff |
| 2010/0306200 | A1 | 12/2010 | Frank et al. |
| 2010/0306707 | A1 | 12/2010 | Caduff |
| 2011/0124351 | A1 | 5/2011 | Frank et al. |

FOREIGN PATENT DOCUMENTS

| | | |
|---|---|---|
| WO | WO-2010/075455 | 7/2010 |
| WO | WO-2010/075456 | 7/2010 |
| WO | WO-2010/075466 | 7/2010 |
| WO | WO-2010/078455 | 7/2010 |

OTHER PUBLICATIONS

International Search Report for PCT/US2009/069312 from the International Searching Authority of the United States Patent and Trademark Office dated Mar. 4, 2010, 2 pages.

International Search Report for PCT/US2009/069313 from the International Searching Authority of the United States Patent and Trademark Office dated Feb. 19, 2010, 2 pages.

International Search Report for PCT/US2009/069860 from the International Searching Authority of the United States Patent and Trademark Office dated Mar. 2, 2010, 2 pages.

Egenhofer, M. J. et al., "A Mathematical Framework for the Definition of Topological Relationships", *Proceedings of the 4th International Symposium on Spatial Data Handling*, Zurich, Switzerland, Jul. 23-27, 1990, pp. 803-813.

Egenhofer, M.J. et al., "Beyond Desktop GIS A Family of Portable Spatial Information Technologies", *In GIS PlaNET*, Lisbon, Portugal, 1998, 4 pages.

Egenhofer, M.J. et al., "Categorizing binary topological relations between regions, lines, and points in geographic databases", Tech. Rep. 90-12, National Center for Geographic Information and Analysis, University of California, Santa Barbara, CA, 1990, 28 pages.

International Search Report and Written Opinion of the International Searching Authority, the European Patent Office, for International Application No. PCT/US2007/072358, dated Nov. 30, 2007, 8 pages.

International Search Report and Written Opinion, International Patent Application No. PCT/US09/36053, mailed Apr. 22, 2009, 6 pages.

Wuershch, et al., "Refined Route Instructions Using Topological Stages of Closeness," presented at the Geological Information Science Conference in Munster, Germany on Sep. 20-23, 2006 (www.giscience.org), pp. 31-41, 12 pages.

* cited by examiner

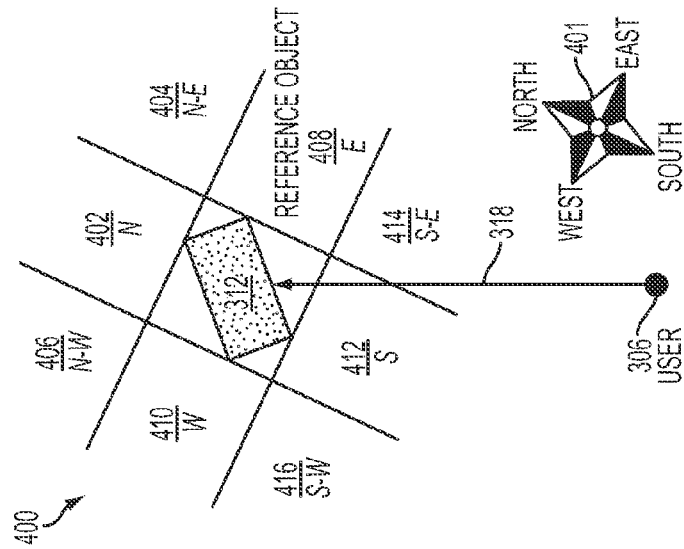
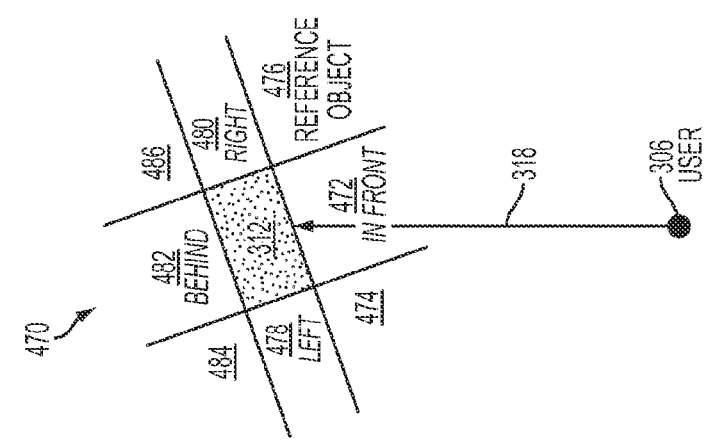
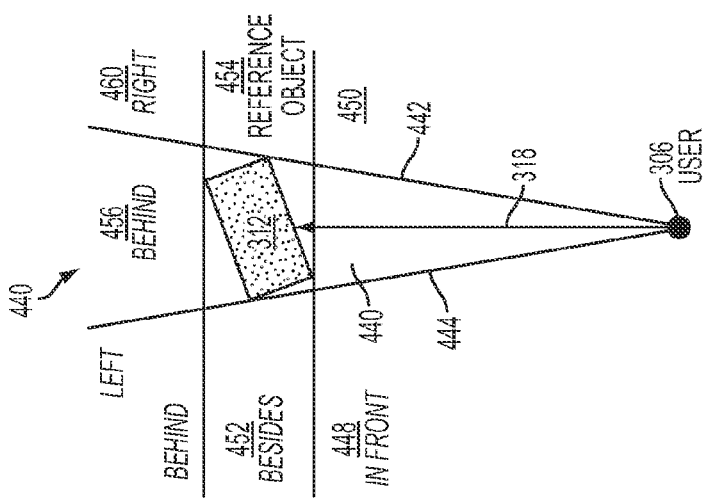

SYSTEM AND METHOD FOR EXPLORING 3D SCENES BY POINTING AT A REFERENCE OBJECT

CROSS-REFERENCE TO RELATED APPLICATION

This application claims priority under 35 U.S.C. §119(e) to U.S. Provisional Application No. 61/139,900, filed Dec. 22, 2008 entitled "System and Method for Exploring 3D Scenes by Pointing at Reference Object," the entire contents of which are incorporated herein by reference.

FIELD OF INVENTION

The present invention relates generally to computer-based systems and methods for exploring environmental scenes represented in a computer-based information system and referring to data or initiating actions associated with individual objects within and beyond such environmental scene. More specifically, the present invention relates to computer-based distributed systems and methods for exploring a spatial scene and manipulating the objects within the environmental scene by (i) directly pointing at the objects or (ii) indirectly by pointing at any visible objects as a reference and using this reference to select the object or objects of interest.

BACKGROUND OF THE INVENTION

Pointing at spatial objects and features with a handheld device to retrieve information about that object or feature stored in a computer-based system database is becoming increasingly popular predominantly in domains such as location-based services (LBS), gaming, or augmented reality. The current generation of handheld devices, such as cellular phones and personal digital assistants (PDAs), include all the components and sensors required to derive the system user's position and direction of pointing, as well as the modules for wireless communications with computer-based information system databases.

Sensor readings acquired by this current generation of handheld devices could be transmitted to certain services or databases, such as spatial databases. In the case of spatial databases, this data will be used to identify and retrieve from such databases information about the object or feature to which the handheld device is currently being pointed. The information that is retrieved will be processed by the wirelessly connected computer-based system and transmitted back to the handheld device, where it will be used to answer a system user's question such as, "What is that object (or feature) over there?".

The set of questions that may be answered using the information that is retrieved from databases described above based on the pointing-at approach has been restricted to properties and attributes related to one explicit object. More specifically, the retrieved information is restricted to a single object at which the handheld device is being pointed. Noting this, answers to questions such as "What is left of that building over there?" or "Are there any hospitals behind that building over there?" or even "What is to the North of that object over there?" are not considered to be included in the retrieved information.

It would be highly desirable to have a system and method that would be able to answer questions relating to a scene presented to a system user that would address more than just the one object or feature being pointed at. A system and method that provides such capabilities would also increase the usability of pointing devices. Further, a system and method that had these capabilities would enhance the interaction between a system user and an expert system (e.g., GIS) relating to location-based services, from which not only information about single objects may be obtained, but also uses a reference object or feature to identify other objects, for example, having the capability to define and identify "The building to the left of that building!". It would also be desirable to have a system and method that could be used to initiate an action or launch a service associated with the object or feature simply by directly or indirectly pointing at the reference object or feature in order to identify the object of interest.

The present invention provides a system and method to overcome the problems of pointing systems of the past.

SUMMARY OF THE INVENTION

The present invention is a system and method that enhances location-based services by enabling computer-based spatial database systems to respond to or answer spatial queries that use a reference object to identify objects or features of interest in the environmental scene presented to a system user. The present invention enhances pointing technology by providing a system and method that allows system users to use queries to identify objects or features within the system user's field of view by pointing at the reference object or feature, and linking it to the object of interest by using spatial prepositions.

According to the present invention, a system user will point at an object or feature in his/her environment, such as within the system user's visual field, for the purpose of identifying the object or feature. A system user can then use that object or feature as reference for requesting additional information or initiating actions associated with other objects located in the vicinity of the object or feature that was first identified. This would be done by pointing at the reference object or feature instead of performing the conventional method specifically requesting information or initiating action associated with each object or feature in the system user's environment, such as within the system user's visual field.

The system of the present invention includes a scene generator that describes the spatial scene as perceived by the system user in terms of the spatial configuration associated with the environment. According to the present invention, "spatial configuration" is understood to include an absolute frame of reference, i.e., North, South, East, West; egocentric frame of reference, i.e., described from the system user's point of view; and intrinsic frame of reference, i.e., based on the object's or feature's structure. Such meta-level scene descriptions will define the semantics of the scene and allow interaction with objects or features surrounding the reference object or feature to which the pointing device is pointing. Further, by describing the visual scene presented to the system user according to the present invention, this scene description also may be used for initiating simple queries about the objects or features located near the reference object or feature. Such a scene description will also permit initiating highly complex queries, such as finding buildings with a specific spatial relation to the reference object or feature.

The scene description according to the present invention will support system user interaction with visual objects or features and, by way of indirect reference, also interaction with object or features that are hidden by other objects or features. Examples of such interactions are initiating a service related to the objects or features, such as a reminder service, or performing actions like switching lights on or off.

Preferably, the present invention permits deriving a system user-centered spatial frame of reference, the egocentric frame of reference. Such an egocentric frame of reference may be used to qualitatively describe the configuration of the spatial scene as perceived by the system user. A scene description of this type will provide the spatial relations between objects or features within and beyond what is visually seen by the system user. The egocentric frame of reference will also form the basis for answering questions related to objects or clusters of objects that surround the reference object or feature.

Mobile devices, principally handheld devices, that include the novel features of the present invention may be adapted for wireless communication with a virtual system or system database on a system server that contains stored representations of objects and features in the system user's environment. Mobile devices incorporating the present invention may also include sensors to determine the spatial relation between the system user and the object or feature being pointed at by the system user using the mobile device. This spatial relation, or axis between the system user and the object or feature, may be used to quantitatively and qualitatively describe the location of objects or features surrounding the object or feature at which the user is pointing. More specifically, the spatial relationship may be used to quantitatively and qualitatively describe the location of surrounding objects or features in terms of their position with respect to the axis established between system user and the reference object or feature. This description may include annotations for an absolute frame of reference, annotations for the egocentric frame of reference, as well as annotations with respect to the object's or feature's intrinsic frame of reference as it relates to the reference object or feature.

According to the present invention, annotating the environmental scene as perceived by system users preferably will establish the foundation for answering questions such as "What is the building to the left of that building?" or "Is there a church behind that building?". These annotations also will provide the foundation for initiating actions or services associated with these buildings, such as "Switch on the light of the building behind that building!"

The present invention will be described in greater detail in the remainder of the specification referring to the drawings.

BRIEF DESCRIPTION OF THE DRAWINGS

FIG. 4A shows an absolute frame of reference according to the system and method of the present invention.

FIG. 4B shows an egocentric frame of reference according to the system and method of the present invention.

FIG. 4C shows an intrinsic frame of reference according to the system and method of the present invention.

DETAILED DESCRIPTION OF THE DRAWINGS

The present invention is a system and method for enhancing location-based services by enabling computer-based spatial database systems to respond to or answer spatial queries that use a reference object to identify objects or features of interest in the environmental scene surrounding a system user. The present invention is applied to pointing technology in such a way that system users are allowed to use queries to identify objects or features within the system user's field of view by pointing at the reference object or feature, and then associating the object or feature of interest by using spatial prepositions with respect to the reference object or feature.

Figure 1:
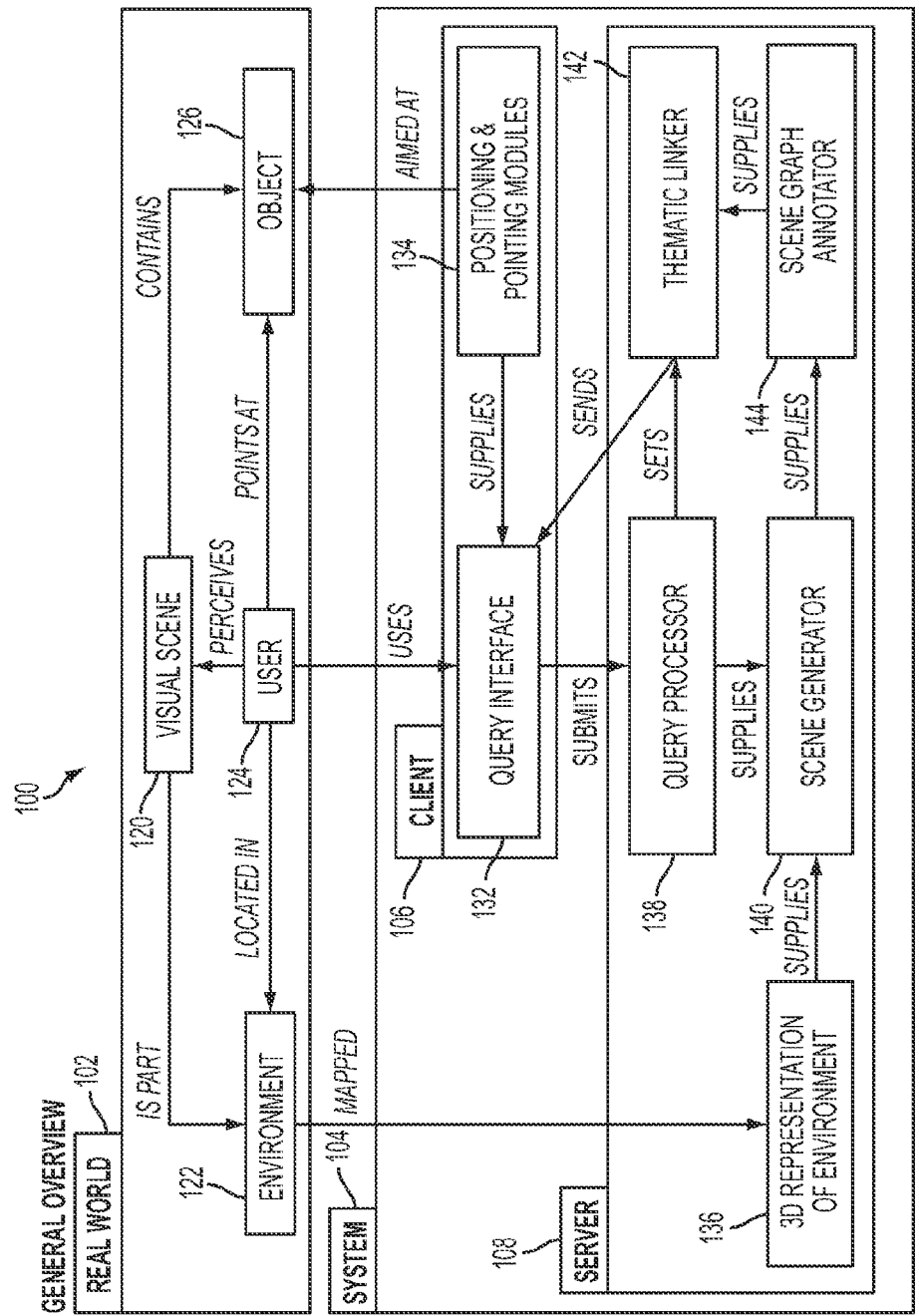
FIG. 1 shows a block diagram of a representative system for carrying out the present invention.
Figure 2:
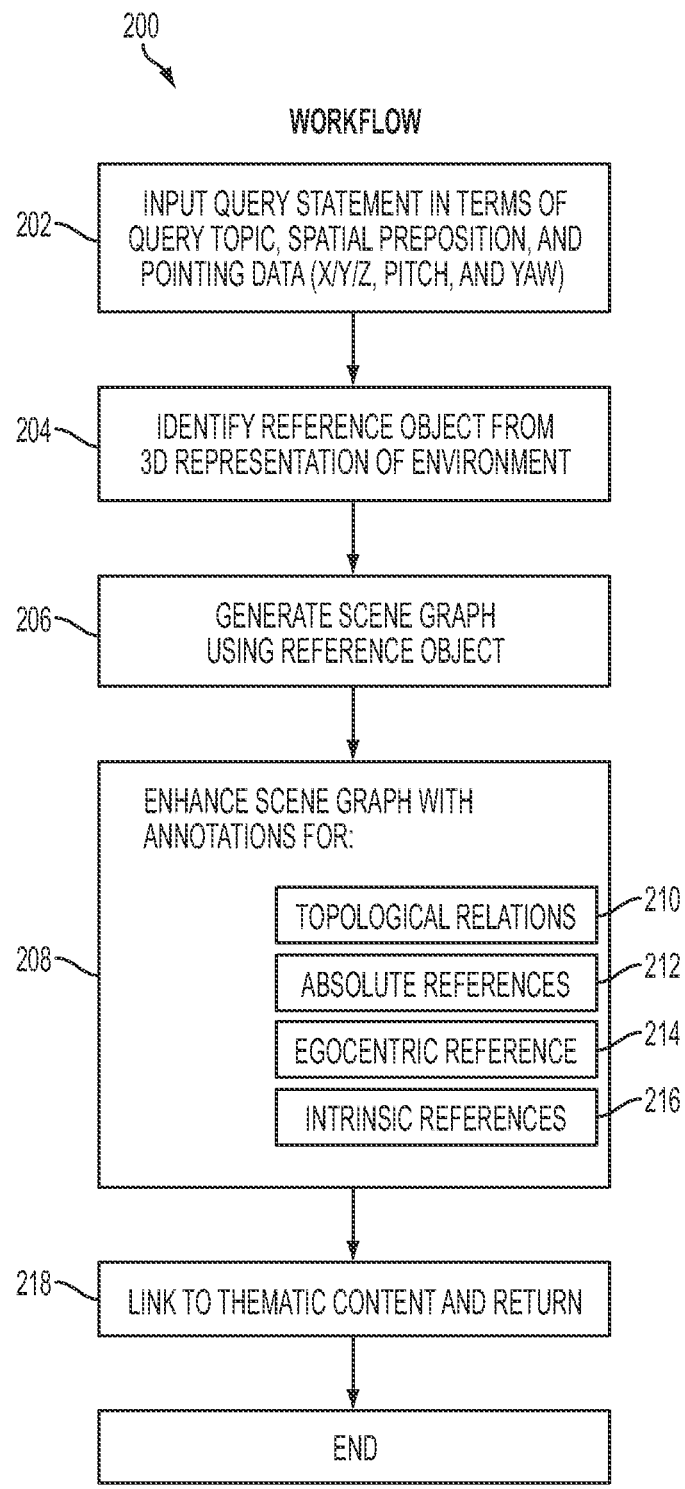
FIG. 2 shows a workflow for carrying out an exemplary method of the present invention.

FIG. 1, generally at 100, shows a general overview of the system of the present invention. FIG. 1 also shows the general information data flow among the elements of the system of the present invention. FIG. 2, generally at 200, shows a workflow according to the present invention, which will be described in greater detail subsequently.

Before discussing FIG. 1 in detail, it is understood that the system of the present invention includes a system client that provides a system user with his/her current position, the direction of pointing, as well as a query interface and a module for wireless communication with a system server. The system server of the present invention also includes system databases (not shown) that store representations of the system user's environment; a scene generator that generates a scene as perceived by the system user; and a scene graph annotator that quantitatively describes the scene and provides the input for answering the system user's queries. FIG. 1 will now be described in detail.

Referring to FIG. 1, generally at 100, system 104 of the present invention is shown in relation to the real-world 102. The real-world 102 represents a visual scene that would be viewed by the system user. System 104 includes system client 106, system server 108, and system storage, preferably in the form of system databases (not shown), for storing at least information relating to at least the environmental scenes that will be experienced by the system user. As shown at 102, system user 124 will be located in environment 122 and will see visual scene 120, which is part of environment 122. Visual scene 120 includes one or more spatial objects 126 that may be pointed at by system user 124.

As stated, system 104 includes system client 106, system server 108, and system storage (not shown). System user 124 interacts directly with system client 106 that includes Query Interface 132, and Positioning and Pointing Modules 134. System user 124 principally interacts with system client 106 at Query Interface 132. When System user 124 points system client 106 at spatial object 126, Positioning and Pointing Modules 134 can determine the position of the system user and the direction of pointing, and supply this information to Query Interface 132 for further processing as part of a query statement.

More specifically with respect to system client 106, it includes (i) Query Interface 132 that is used by the system user for the formulation of queries, browsing results, and receiving and displaying information; (ii) a sensor for deriving the system user's current position within an absolute three-dimensional (3-D) frame of reference, e.g., WGS84 for GPS; and (iii) a sensor for deriving direction as a two-valued vector representing yaw and pitch, i.e., azimuth and elevation angle in geodetic terms, whereby (ii) and (iii) are part of Positioning and Pointing Modules 134. Further, system client 106 includes a communication module that receives the query formulation from Query Interface 132 and prepares it for submission to system server 108, where it is processed.

System server 108 receives query statements including the system user's location and pointing direction with respect to environment 122 in which system user 124 is located. System server 108 at 136 contains a 3-D representation of environment 122, in which the object or feature of interest is determined based on the location and pointing direction of system client 106. As stated, the system user's geographic location information may be provided to system server 108, by, for example, a GPS sensor associated with system client 106. Other methods of determining the environmental scene may be used and still be within the scope of the present invention.

As stated, 3-D Representation of Environment 136 and Query Processor 138 communicate with Scene Generator 140 for determining the object that the system user is pointing at and for producing the 3-D scene graph. 3-D Representation of Environment 136 communicates scene information to Scene Generator 140 and Query Processor 138 communicates query information generated by the system user to Scene Generator 140, including location information and pointing direction. Scene Generator 140 produces a scene graph that corresponds to the scene in the system user's field of view. Scene Generator 1450 also adds information about objects or features beyond the visual objects to the scene graph. Scene Graph Annotator 144 adds qualitative attributes about the spatial configuration of the scene perceived by the system user. Thematic Linker 142 is for linking generic information about objects or features to the scene graph. Examples of such generic information includes, but is not limited to, publicly available tax information about buildings, history of monuments, etc.

Referring to system server 108, system user 124 defines a query statement using Query Interface 132 and the communication module (not shown) of system client 106 sends this statement to Query Processor 138. Query Processor 138 uses Scene Generator 140 to generate a visual scene from 3-D Representation of Environment 136 as perceived by system user 124. This scene is used for identifying the spatial objects or features of interest in the system user's visual scene 120. Scene Generator 140 further enhances this scene with objects that are hidden to system user 124. Query Processor 138 processes of the received queries and employs Scene Generator 140 and Thermatic Linker 142. Specifically, Query Processor 138 transmits system user location and pointing direction to Scene Generator 140 and requests for specific information about objects or features in the system user's environment (visible or invisible) to Thematic Linker 142.

Scene Generator 140 provides a visual scene and the identity of the object or feature that the system user pointed at to Scene Graph Annotator 144. Scene Graph Annotator 144 carries out its above-described actions by adding information about the absolute, egocentric, and intrinsic setup of the scene. Scene Graph Annotator 144 sends the fully described scene to Thematic Linker 142. Thematic Linker 142 enhances the scene description based upon inputs from Query Processor 138 and Scene Graph Annotator 144, and transmits the answer to the query defined by system user 124 back to Query Interface 132.

It is understood that each of the elements shown in system server 108 may be separate modules or integrated into one or more modules and still be within the scope of the present invention. It is also understood that the elements of client server 116 may be separate modules or integrated into one or more modules and still be within the scope of the present invention.

Referring to FIG. 2, generally 200, a workflow according to the present invention will be described. In general, a workflow according to the present invention will include (i) capturing position, azimuth, and elevation angle of the pointing direction of the system client, and submitting the captured information to the system server, (ii) generating a two-dimensional (2-D) scene representation of the visual scene presented to the system user from the 3-D representation on the system server and identifying a reference object, (iii) generating a scene graph using the system user's position and a reference object, (iv) enhancing the scene graph with qualitative annotations for topographical relations, absolute references, egocentric references, and intrinsic references, and (v) transmitting the scene graph back to the system client for exploration and interaction with spatial objects by the system user.

Again referring to FIG. 2, at 202, an input query statement is generated by system user 124 using Query Interface 132 of system client 106. Query interface 132 provides the system user with means to define the terms and conditions of the query statement. Query statements are set forth as a combination of the system user's location and pointing direction from which a reference object or feature is determined in Scene Generator 140, a term defining the spatial relation between the reference object and the object or objects of interest, and an expression that indicates the topic of interest or action to be performed. In regard to the latter referred to expression, an example of such a topic of interest would be historic buildings that the system user may be interested in or an action such as launching a bookmarking service associated with the object or feature of interest.

Noting the preceding with regard to the elements of a query statement, if a system user wanted to know if there is a hospital behind a building that is within his/her field of view, an example of a statement would be following:

"Are there any HOSPITALs BEHIND that BUILDING over THERE?"

According to the query statement example just provided, HOSPITALs represents the object or feature of interest and its concept, BEHIND, is the spatial relation between the object of interest and the reference object. "BUILDING over THERE" is the reference object that establishes the axis between the system user and reference object, which is added to the query statement by pointing at the reference object, i.e., as location and pointing direction. The remaining part of the query statement, the system user's location, would be determined based on the position of the system client using, for example, a GPS sensor associated with the system client. A preferable form of a query statement will include at least three components: queryTopic, spatialPreposition, and Location (HERE, THERE, SCENE). An example of a possible query statement is shown below in BNF ("Backus Naur Form") notation:

```
<queryStatement> ::=
    <queryTopic>
    <spatialPreposition>
    { <HERE_Location> | <THERE_Location> | <SCENE> }
<queryTopic> ::=
    "What is" | "Are there any" <concept> | "Is" <instance>
<concept> ::= type of object         Note: This is input by the user
<instance> ::= name of object        Note: This is input by the user
<spatialPreposition> ::=
    <absolute> | <egocentric> | <intrinsic>
<absolute> ::=
    "North" | "East" | "South" | "West" | "NE" | "SE" | "SW" |
    "NW"
<egocentric> ::=
    { <egoLatPrep> | <egoLongPrep> | <egoVertPrep> } "of"
<egoLatPrep> ::=
    "left" | "right"
<egoLongPrep> ::=
    "in front" | "behind"
<egoVertPrep> ::=
    "above" | "below"
```

-continued

```
<intrinsic> ::=
    "in" |
    "left" | "right" |
    "behind" | "in front" |
    "on top" | "underneath"
<HERE_Location> ::=
    User location, pitch, yaw, radius
<THERE_Location> ::=
    User location, pitch, yaw, radius     Note: Used for identifying
                                          reference object
<SCENE> ::=
    User location, pitch, yaw, visual-angle [, maxDistance]
```

As stated, the exemplary query statement includes three components: the queryTopic, spatialPreposition, and the Location (HERE/THERE/SCENE). The query topic consists of a beginning phrase such as "What is," and the type and name of the object of interest. The spatial preposition will involve the absolute, egocentric, and intrinsic frames of references. The HERE/THERE/SCENE will involve the system user's location (HERE Location), the reference object's location (THERE Location), and the system user's view frustum, the SCENE. The HERE and THERE locations will be defined in pitch, yaw, and radius, and the SCENE will be defined in pitch, yaw, and visual angle. Depending on the configuration of the query statement, one or multiple spatial objects may be referenced. Further, the view frustum is not required to filter occluded objects but rather annotates them and therefore includes all objects within a specified region for purposes of identification.

It is understood that the query statement provided above is by way of example and not limitation. Other forms of the query statement are contemplated and therefore are within the scope of the present invention. Further, the definitions that have been provided with respect to the components of the query statement also are provided by way of example and other definitions may be used and still be within the scope of the present invention.

Figure 3:
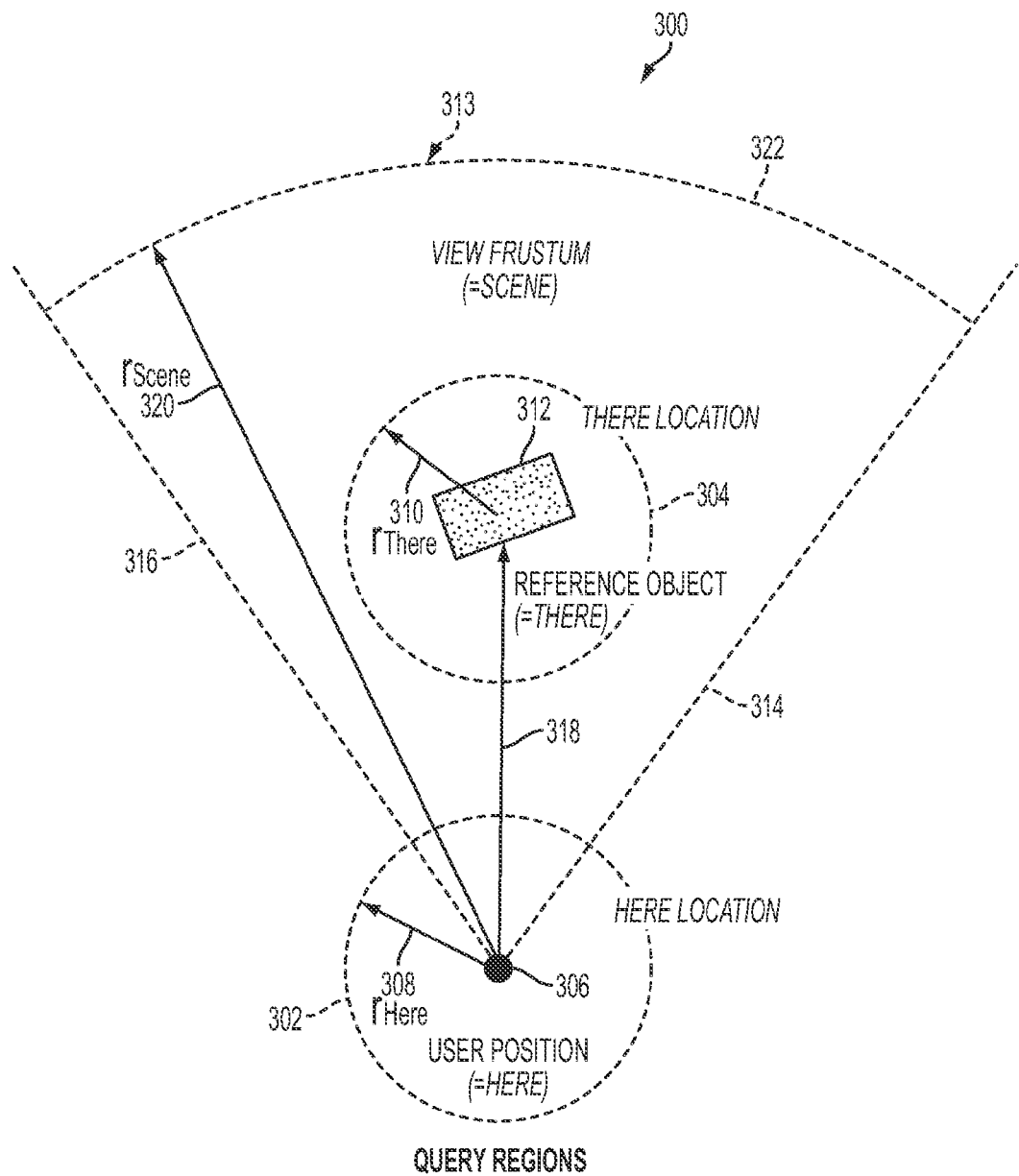
FIG. 3 shows a representation of the query regions associated with the system and method of the present invention.

Referring to FIG. 3, generally at 300, the regions associated with the component HERE/THERE/SCENE will be described in greater detail. Referring to FIG. 3, the three query regions are HERE Location 302, THERE Location 304, and view frustum 313. HERE Location 302 corresponds to a query region of conventional location-based services (LBS). However, the query performed within the HERE Location includes directional information provided by directional sensors. As such, the query supports egocentric queries such as "What is to my left?" or "What is to my right?" or "Are there any hospitals in front of me?". These queries are not contemplated by conventional LBS.

Preferably, system user 306 is located in the center of HERE Location 302. Radius $r_{Here}$ 308 will define the size of the HERE Location. However, it is understood that other shapes may define the HERE Location and still be within the scope of the present invention.

In FIG. 3, system user 306 is pointing system client 106 in direction 318 at reference object 312 located at THERE Location 304. As such, THERE Location 304 is derived from the system user 306's current HERE Location position and pointing direction 318. Thus, reference object 312 located at THERE Location 304 will have its position derived from the HERE Location position and pointing direction 318. The position of the reference object will be used to establish the egocentric frame of reference that will be discussed subsequently.

Preferably, THERE Location 304 includes reference object 312 at the center and the size of the THERE Location will be defined by radius $r_{There}$ 310. However is understood that other shapes and sizes of THERE Location 304 and position may be possible and still be within the scope of the present invention.

The egocentric frame of reference is defined by the relationship between system user 306 and reference object 312. The understanding of this relationship permits the present invention to address objects within the system user's field of view as being left or right, in front or behind, above or below the reference object. Queries involving the THERE Location will return objects located within the region defined by that area.

The SCENE is defined by view frustum 313. View frustum 313 is bounded by rays 314 and 316, and curved line segment 322 determined by radius $r_{Scene}$ 320. For purposes of object identification, view frustum 313 will include all objects that are within the visual angle defined by rays at 314 and 316 and optionally bounded by curved line segment 322. Preferably, view frustum 313 is understood to represent the system user's perceived field of view, including hidden or obscured objects within the visual angle. The view frustum also can be used to derive the radial distance for the THERE Location. For example, the THERE location of a query statement may extend from the center of the object or feature of interest 312 to the bounds of the view frustum.

In FIG. 2, it indicates that spatial prepositions are provided as part of the query statement generated by the system user at 202. The spatial prepositions the system user generates are based on the absolute frame of reference (FIG. 4A), egocentric frame of reference (FIG. 4B), and intrinsic frame of reference (FIG. 4C). These frames of reference will define a spatial relationship between a query topic and query location. For example, in the exemplary query statement provided previously, HOSPITAL would be the query topic, the location of the building that is directly being pointed at by the system user would be the object of reference from which results are derived, and the area from BEHIND the reference object to the bounds of the SCENE would be the query location.

As stated, the query statement links the topic of the query to the query location by means of a spatial preposition. For purposes of understanding the present invention and not of limitation, a query statement may be "Is there a hospital North of the building?". In this statement, the query topic, namely the search for a hospital, is well defined in a spatial relationship with the reference object, the building that is being pointed at. In this case, the query location would be "North of the building." The type of spatial preposition will depend on the frame of reference in which the system user addresses objects. These frames of reference include, but are limited to, absolute, egocentric, and intrinsic frames of reference. Although only three frames of reference have been described, it is understood that more or less than three may be used and still be within the scope of the present invention.

Referring to FIG. 4A, generally at 400, an absolute frame of reference according to the present invention will be described. Absolute frame of reference 400 describes the spatial relationship between system user 306, reference object 312, and an object of interest according to the query statement in terms of the global environment represented by compass rose 401. The spatial relationship also will be dependent on pointing direction 310. For example, North, South, East, and West are absolute spatial references for defining a query statement.

In FIG. 4A, there are eight reference areas that may be used if the absolute frame of reference is used for defining the position of an object of interest. The object of interest may be located at North area 402, Northeast area 404, Northwest area 406, East area 408, West area 410, South area 412, Southeast area 414, or Southwest area 416. However, it is understood that there may be more or less than eight areas for defining the position of an object of interest and still be within the scope of the present invention.

The use of absolute frames of reference will depend on the type of space in which the system user is located. As an example, geographic space may be described by cardinal directions for outdoor areas which may not be conducive for use in describing the absolute frame of reference for virtual or indoor environments.

Referring to FIG. 4B, generally at 440, an egocentric frame of reference according to the present invention will be described. Egocentric reference frame 440 describes spatial relationships from system user 306's point of view, or from another person's point of view, in circumstances when the system user is taking another person's position. For example, using an egocentric frame of reference, the query statement may be "the monument is in front of the building." This query statement would mean the monument is in front of the building between system user 306 and building 312. The spatial relationship also will depend on pointing direction 318.

In FIG. 4B, there are eight reference areas that may be used if the egocentric frame of reference is used for defining the position of an object of interest. These are defined in part by rays 442 and 444 emanating from system user 306. The object of interest may be located at In Front area 446, In Front-Left area 448, In Front-Right area 450, Besides-Left area 452, Besides-Right area 454, Behind area 456, Behind-Left area 458, or Behind-Right area 460. However, it is understood that there may be more or less than eight areas for defining the position of an object of interest and still be within the scope of the present invention.

Referring to FIG. 4C, generally at 470, an intrinsic frame of reference according to the present invention will be described. Intrinsic reference frame 470 describes spatial relationships in terms of the structural peculiarities of objects in a scene. For example, using an intrinsic frame of reference, the query statement may be "the monument in front of the building." This query statement in intrinsic terms would mean the monument is located directly in front of building 312 regardless of the position of the monument relative to system user 306. The spatial relationship also will be dependent on pointing direction 318.

In FIG. 4C, there are eight reference areas that may be used if the intrinsic frame of reference is applied for defining the position of an object of interest. The object of interest may be located at In Front area 472, In Front-Left area 474, In Front-Right area 476, Left area 478, Right area 480, Behind area 482, Behind-Left area 484, or Behind-Right area 486. However, it is understood that there may be more or less than eight areas for defining the position of an object of interest and still be within the scope of the present invention.

Is understood that the phraseology for spatial prepositions can be other than what is represented in FIGS. 4A, 4B, and 4C and still be within the scope of the present invention.

Referring to FIG. 2, once the query statement has been generated and transmitted from system client 106 to Query Processor 138, the identity of the reference object is determined at 204 based on the transmitted information as it applies to 3-D representation of the environment 136 in system server 108. Following the identification of the referenced object, the present invention moves to step 206 to generate a scene graph using the reference object.

Referring to FIG. 1, Query Processor 138 will parse the query statement into location information for transmission to Scene Generator 140 and content filtering information for transmission to Thematic Linker 142. The parsed input to Scene Generator 140 results in a description of the scene surrounding the system user and information about the object or feature of reference being transmitted from Scene Generator 140 to Scene Graph Annotator 144. The scene graph that is generated by Scene Generator 140 is derived from the system user's position and pointing direction information. Preferably, the generated scene is an extended computational representation of the perspective scene used by system user 124 for spatial reasoning. The generated scene will include, but not be limited to, all of the objects (visible and occluded) in view frustum 313 (FIG. 3) of the system user along with the relative spatial configuration. The relative spatial configuration, preferably, will be expressed as binary spatial relations reflecting absolute spatial prepositions between the single objects and intrinsic spatial prepositions for individual objects. For example, the absolute binary spatial relation between two objects may be expressed as "Object A is North of Object B" or "Object A is adjacent of Object B".

The scene graph generated at 206 in FIG. 2 is the input to Scene Graph Annotator 144. At 208 in FIG. 2, Scene Graph Annotator 144 adds egocentric spatial prepositions to the scene graph. The egocentric spatial prepositions will describe the position of the object of interest with respect to the system user's position relative to the reference object. It is further understood that absolute and intrinsic spatial prepositions may be calculated a priori and do not need to be derived in the scene graph annotator. Preferably, the spatial prepositions present in the annotated scene graph at Scene Graph Annotator 144 will correspond to the set of spatial prepositions available in Query Interface 132.

It is understood that Screen Graph Annotator 144 will enhance the scene graph. Although enhancing the scene graph with absolute information at 212, egocentric information at 214, and intrinsic information 216 has just been described, it is understood that the scene graph may be enhanced by topographical information at 210 and still be within the scope of the present invention.

Once the scene graph is fully annotated at Scene Graphic Annotator 144, the annotated scene graph may be used to answer the system user's query. If the system user's query is a thematic query, such as a query for restaurants behind the object or feature of reference, Scene Graph Annotator 144 will send a filtering request for restaurants to Thematic Linker 142.

At 218 in FIG. 2, Thematic Linker 142 identifies the object or set of objects of interest, e.g., the building behind the building being pointed at or the hospitals behind the object being pointed at, and link or filter thematic data relating to the query topic to that object or set. An example of the thematic data being linked may be menus linked to restaurants or videos about historic monuments being linked to them. After linking according to step 218 takes place, the annotated scene graph, along with the thematic content is returned to system client 106, where it is presented to system user 124 using Query Interface 132.

As stated, Scene Graph Annotator 144 adds spatial prepositions to the scene graph produced by Scene Generator 140. These annotations are qualitative statements about the position of objects with respect to the axis defined by the system user's position and the position of the reference object being pointed at. Qualitative statements describe the configuration in terms of natural language statements, rather than metric statements, and are, therefore, simpler to understand by system users. An example of a quantitative statement that describes the configuration is the spatial preposition LEFT, as in building A is LEFT of building B.

Figure 5:
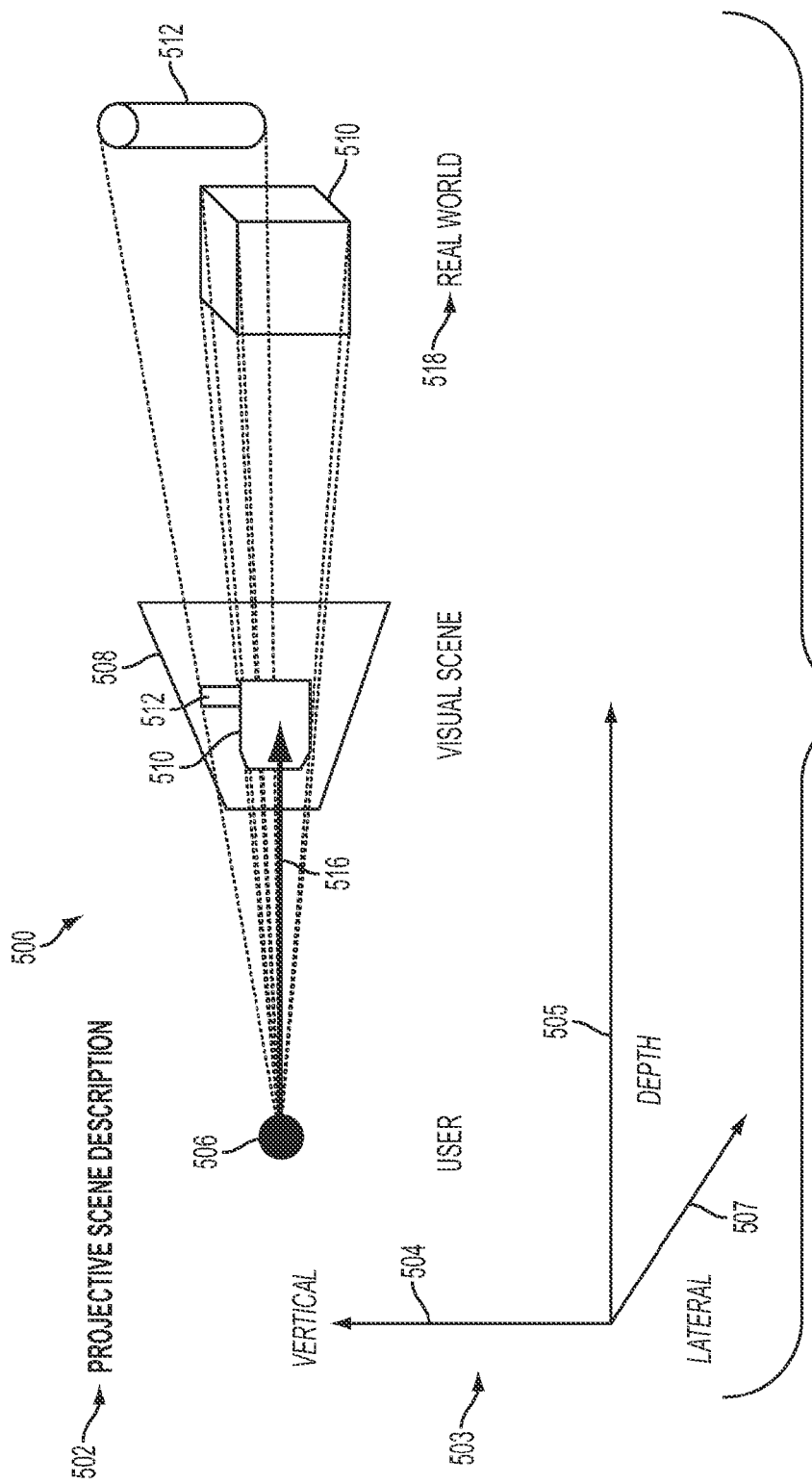
FIG. 5 shows a representative example of a visual scene which system users may use for a projective scene description according to a system and method of the present invention.

FIG. 5, generally at 500, describes projective scene description 502. According to FIG. 5, the set of qualitative statements is comprised of (i) a set for lateral and vertical prepositions and (ii) a set of prepositions to reflect the depth of the perceived scene. As shown at 503 in FIG. 5, a three-coordinate system is shown, which includes vertical at 504, depth at 505, and lateral at 507. The statements for lateral, vertical, and depth descriptions of the scene are derived in part from the work by Papadias and Egenhofer (1992), titled "Hierarchical Reasoning about Direction Relations", which is incorporated herein by reference. This reference is directed to a set-theoretic approach to projective topological relations among spatial objects, which results in the 169 distinct relations among two objects in the projective plane. This will be described in detail at FIG. 6.

Again referring to FIG. 5, generally at 500, the relationship of visual scene 508 and real-world 518 will be described. For identifying an object or feature, such as a reference object 510, system user 506 will point system client 106 (FIG. 1) at reference object 510 using pointing direction 516. Projective scene description 502 is based on a three-coordinate system 503. Based on a three-coordinate system 503, system user 506 will have a 2-D description of visual scene 508 from the 3-D representation of real-world view 518 for defining spatially separated building 510 and silo 512. In this scene, building 510 would be the reference object and silo 512 could be defined based on its position from reference object 510.

Figure 6:
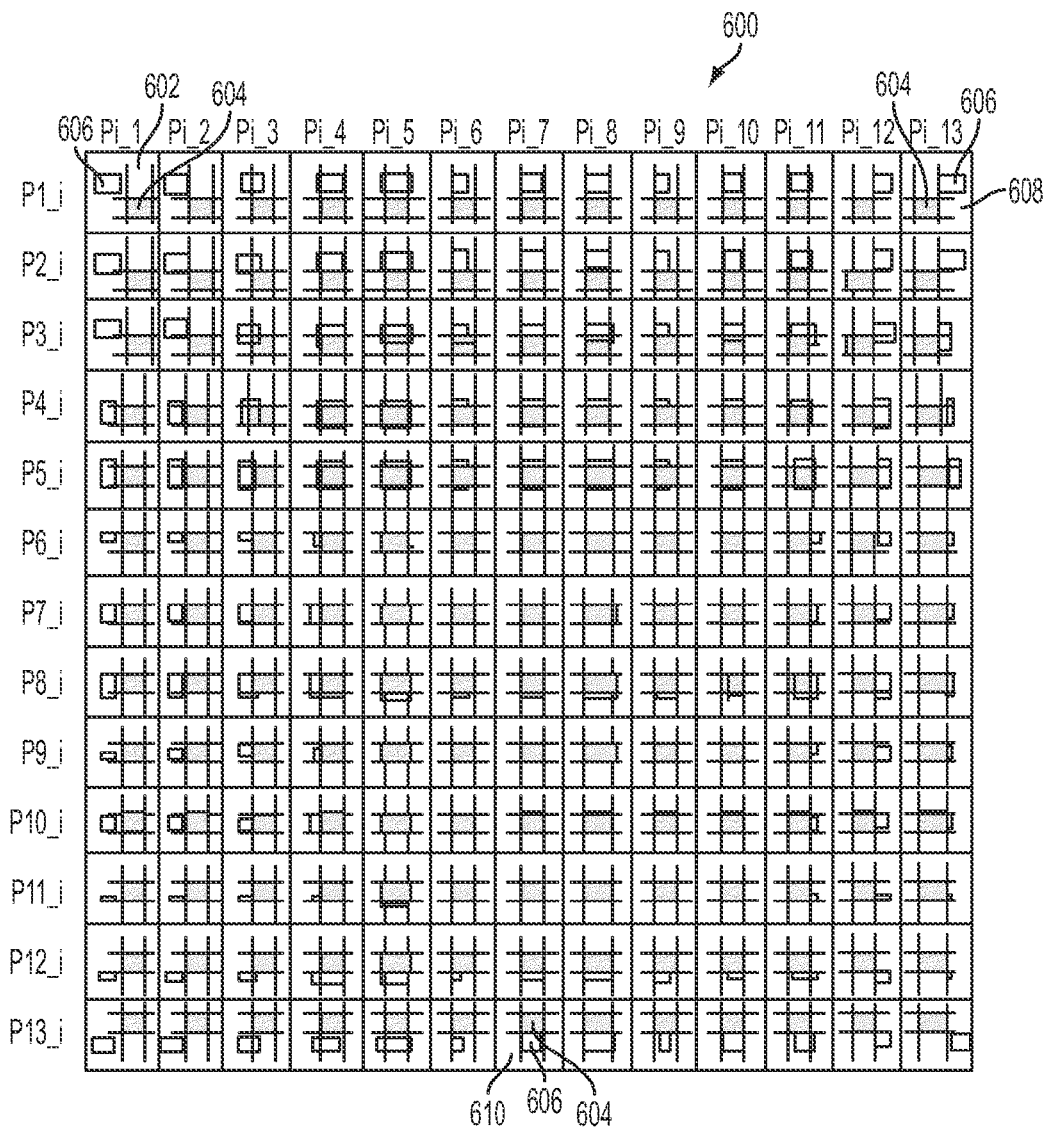
FIG. 6 shows an example of a set of projected topical relations derived according to the system and method of the present invention.

FIG. 6, generally at 600, provides an example of a set of projected topical relations derived according to the present invention that uses in part what is described in Papadias and Egenhofer (1992). Specifically, the present invention derives a set of relations from the scene graph and maps the individual configurations to qualitative statements, such as "right," "left above," or "behind." According to FIG. 6, at 602, object of interest 606 would be to the left of reference object 604; at 608, object of interest 606 would be to the right of a reference object 604; and at 610, object of interest 606 would be above reference object 604. Depth statements cannot be derived from the topological approach used by Papadias and Egenhofer since configurations like "behind-left" are not reflected in the set of relations. The present invention adds at least these additional depth statements that will define the distance between the system user and reference object in order to derive additional depth statements for objects or object of interest that do not overlap with the reference object that are in the visual scene.

It is understood that the elements of the systems of the present invention may be connected electronically by wired or wireless connections and still be within the scope of the present invention.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments or portions thereof, may also be implemented as a machine-readable storage medium, configured with a computer program, where, upon execution, instructions in the computer program cause a machine to operate to perform the functions of the embodiments described above.

The embodiments or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present invention is not intended to be limited to the embodiments shown or described herein.

The invention claimed is:

1. A computer-implemented method for responding to spatial queries about a real-world object of interest using a real-world reference object to identify the object of interest, comprising the steps of:
  (A) generating a query statement relating to at least one real-world object of interest with an electronic pointing device associated with a user, with the query statement including at least a query topic and a spatial preposition, and determining a geodetic position and a pointing direction of the pointing device, and transmitting the query statement, the geodetic position and the pointing direction to a system server;
  (B) mapping a projective three-dimensional representation of a real-world scene including at least the object of interest and the reference object, and transmitting the three-dimensional representation to the system server;
  (C) a system server performing substeps of,
    (1) generating a real-world two-dimensional digital representation of the three-dimensional scene mapped at step (B), with the two-dimensional digital representation including at least a digital representation of the object of interest and the reference object,
    (2) identifying the reference object and the reference object position according to the pointing device geodetic position and the pointing direction applied to the two-dimensional digital representation, wherein the pointing device geodetic position is according to a latitude, longitude, elevation, pitch, and yaw of the pointing device,
    (3) annotating the two-dimensional digital representation for identifying the object of interest according to the position of the reference object, the query topic, and the spatial preposition, (4) identifying the object of interest according to annotated two-dimensional digital representation at substep (C) (3) by linking the query topic and the spatial preposition of the query statement to a particular object in the two-dimensional digital representation, wherein the spatial preposition including an egocentric frame of reference expressing at least a point of view of the user according to the pointing device geodetic position, and (5) the system server communicating with the pointing device and transmitting at least an identification of the particular object as the object of interest to the pointing device.

2. The method as recited in claim 1, wherein the pointing device and system server communicate wired or wirelessly.

3. The method as recited in claim 1, wherein the query statement includes the object of interest as a query topic.

4. The method as recited in claim 1, wherein the spatial preposition includes a spatial relationship between the object of interest and the reference object.

5. The method as recited in claim 4, wherein the egocentric frame of reference identifies the object of interest according to the reference object position and the pointing device geodetic position.

6. A computer-implemented method for responding to spatial queries about a real-world object of interest using a real-world reference object to identify the object of interest, comprising steps of:

(A) generating a query statement relating to at least one real-world object of interest with an electronic pointing device associated with a user, with the query statement including at least a query topic and a spatial preposition, and determining a geodetic position and a pointing direction of the pointing device, and transmitting the query statement, the geodetic position and the pointing direction to a system server;

(B) mapping a projective three-dimensional representation of a real-world scene including at least the object of interest and the reference object, and transmitting the three-dimensional representation to the system server;

(C) a system server performing substeps of,
  (1) generating a real-world two-dimensional digital representation of the three-dimensional scene mapped at step (B), with the two-dimensional digital representation including at least a digital representation of the object of interest and the reference object,
  (2) identifying the reference object and the reference object position according to the pointing device geodetic position and the pointing direction applied to the two-dimensional digital representation, wherein the pointing device geodetic position is according to a latitude, longitude, elevation, pitch, and yaw of the pointing device,
  (3) identifying the object of interest according to the position of the reference object, the query topic and the spatial preposition by linking the query topic and the spatial preposition of the query statement to a particular object in the two-dimensional digital representation, wherein the spatial preposition including an egocentric frame of reference expressing at least a point of view of the user according to the pointing device geodetic position, and
  (4) the system server communicating with the pointing device and transmitting at least an identification of the particular object as the object of interest to the pointing device.

7. The method as recited in claim 6, wherein the pointing device and system server communicate wired or wirelessly.

8. The method as recited in claim 6, wherein the query statement includes the object of interest as a query topic.

9. The method as recited in claim 6, wherein the spatial preposition includes a spatial relationship between the object of interest and the reference object.

10. The method as recited in claim 9, wherein the spatial preposition further identifies the object of interest according to an absolute frame of reference expressing at least a geographically directional reference applied to the reference object position.

11. The method as recited in claim 9, wherein the spatial preposition further identifies the object of interest according to an intrinsic frame of reference expressing at least architecturally structural reference applied to the reference object position.

12. A system for responding to spatial queries about a real-world object of interest using a real-world reference object to identify the object of interest, comprising:

a pointing device associated with a user for
  pointing at a reference object in a real-world scene and generating a query statement including a query topic and a spatial preposition, relating to the object of interest according to a position of the reference object,
  determining a geodetic position and a pointing direction of the pointing device, and
  communicating the query statement, and the pointing device geodetic position and the pointing direction to a system server; and a system server further comprising,
  a mapping module for receiving and processing a projective three-dimensional representation of an environment that contains a real-world scene including the reference object and the object of interest,
  a scene generator that
    connects to the mapping module and receives an output from the mapping module for generating a real-world two-dimensional digital representation of the real-world scene including the reference object and the object of interest, and
    identifies the reference object according to the pointing device geodetic position and the pointing direction applied to the two-dimensional digital representation, wherein the pointing device geodetic position is according to a latitude, longitude, elevation, pitch, and yaw of the pointing device,
  a scene annotator for
    annotating the two-dimensional digital representation for identifying the object of interest according to the position of the reference object, the query topic and the spatial preposition of the query statement by linking the query topic and the spatial preposition to a particular object in the two-dimensional digital representation, wherein the spatial preposition including an egocentric frame of reference expressing a user's point of view according to the pointing device geodetic position, and
    communicating to the pointing device an identification of the particular object as the object of interest.

13. The system as recited in claim 12, wherein the pointing device includes a mobile device.

14. The system as recited in claim 12, wherein the egocentric frame of reference identifies the object of interest according to the reference object position and pointing device geodetic position.

15. The system as recited in claim 12, wherein the pointing device and system server communicate wired and wirelessly.

16. A system for responding to spatial queries about a real-world object of interest using a reference object to identify the object of interest, comprising:
- a pointing device associated with a user for
  - pointing at a reference object in a real-world scene and generating a query statement including a query topic and a spatial preposition, the query statement relating to the object of interest according to a geodetic position of the reference object,
  - determining a geodetic position and a pointing direction of the pointing device, and
  - communicating the query statement, and the pointing device geodetic position and the pointing direction to a system server; and
- a system server further comprising,
  - a mapping module for receiving and processing a projective three-dimensional representation of an environment that contains a real-world scene including the reference object and the object of interest,
  - a scene generator that
    - connects to the mapping module and receives an output from the mapping module for generating a real-world two-dimensional digital representation of the real-world scene including the reference object and the object of interest, and
    - identifies the reference object according to the pointing device geodetic position and the pointing direction applied to the two-dimensional digital representation, wherein the pointing device geodetic position is according to a latitude, longitude, elevation, pitch, and yaw of the pointing device, and
  - an identifier module for
    - identifying the object of interest in the two-dimensional digital representation according to the position of the reference object and the query topic and the spatial preposition of the query statement by linking the query topic and the spatial preposition to a particular object in the two-dimensional digital representation, and
    - communicating to the pointing device an identification of the particular object as the object of interest wherein the spatial preposition including an egocentric frame of reference expressing a user's point of view according to the pointing device geodetic position.

17. The system as recited in claim 16, wherein the pointing device includes a mobile device.

18. The system as recited in claim 16, wherein the identifier module further includes applying an absolute frame of reference expressing at least a geographically directional reference for identifying the object of interest according to the reference object position.

19. The system as recited in claim 16, wherein the identifier module further includes applying an intrinsic frame of reference expressing at least an architecturally structural reference for identifying the object of interest according to the reference object position.

20. The system as recited in claim 16, wherein the pointing device and system server communicate wired and wirelessly.

* * * * *